Patented Dec. 15, 1931

1,837,010

UNITED STATES PATENT OFFICE

EUGEN BERNHARD, OF FRANKFORT-ON-THE-MAIN, AND GUENTHER KUNZE, OF OPPAU, GERMANY, ASSIGNORS TO I. G. FARBENINDUSTRIE AKTIENGESELLSCHAFT, OF FRANKFORT-ON-THE-MAIN, GERMANY

PRODUCTION OF PURE GLYCERINE

No Drawing. Application filed February 28, 1930, Serial No. 432,260, and in Germany March 14, 1929.

The present invention relates to improvements in the production of pure glycerine.

The manufacture of pure glycerine, such as is required for the manufacture of dynamite is carried out by subjecting crude glycerine, if desired, continuously, to a vacuum distillation with the aid of steam heated to a temperature above 100° C. This manner of working up crude glycerine is attended by a number of objections, such as decomposition and resinification of the contents of the retort by the superheated steam, excessive use of steam and the like. On the other hand liquid organic substances which are practically insoluble in water have been treated with a mist of a liquid in vacuo and at a temperature above the boiling point of the liquid, forming the mist, at atmospheric pressure.

We have now found that the aforedescribed objections in the production of pure glycerine are obviated and that a highly concentrated pure glycerine can be obtained by treating crude glycerine, notwithstanding its solubility in water and certain organic solvents, at a pressure below atmospheric pressure and at elevated temperature with liquids which are not injurious to the glycerine and possess a boiling point below the temperature of working at the pressure chosen, such as alcohol, benzene, benzine, water and the like in a finely divided state, preferably in the form of a mist, the treatment preferably being carried out with the conjoint application of a gaseous carrier for the mists, such as gases or vapors or mixtures of gases or vapors, and as a continuous operation. These liquids must be of course so chosen that their boiling points are below that of the glycerine. For the sake of brevity the liquids in the aforesaid finely divided state will be defined as mist or mists. The degree of vacuum should be as low as possible, such as say below 100 millimeters mercury, whereby considerable heat can be saved and the glycerine can be kept at a rather low temperature which avoids any decomposition or by-reaction. By this process it is possible to carry out the distillation of glycerine rapidly and without difficulty; even after one single distillation a highly concentrated, very pale, neutral and pure glycerine which meets the highest requirements is obtained, and it has a pure sweet taste and is free from inorganic matter, such as lime, chlorides and the like. The surprising effect is apparently due to the sudden expansion of the globules of the mists with the formation of vapors therefrom within the crude glycerine without the application of strongly heated agents, such as superheated steam.

The concentration of dilute solutions of, or containing, glycerine, such as Twitchell process sweet waters, spent soap lyes and the like, may be advantageously combined with the distillation, by passing the solution after purification before the distillation, preferably in shallow layers through an apparatus provided with special protective means to prevent excessive foaming, such as deflecting plates, foam receivers, air valves and the like, contained, if desired, in apparatus of tower type or in simple stills for the treatment with mists, in which the means for introducing steam are removed, or by injecting the material under treatment through nozzles onto baffle plates, which may also be kept in rotation, contained in suitable chambers. In the chambers of these apparatus the solution is concentrated under reduced pressure and at elevated temperature, and the velocity of throughput, the time, the length of the chambers and the fall in temperature are so chosen that the concentrated glycerine flows from the last chamber at a temperature of from about 50° to 60° C. The concentrated crude glycerine then passes into a preheated chamber of the distillation chamber proper which is constructed similarly to that hereinbefore described and is likewise provided with means for introducing gases or vapors and with means for protection against excessive foaming. The distillation of the glycerine may be carried out in this apparatus for example at a pressure of from 15 to 30 millimeters of mercury and at a temperature of from 160° to 180° C. under the direct action for example of a steam which contains finely dispersed water mist. The withdrawal of the glycerine foots is effected through a sufficiently wide pipe heated with steam or gas and in which similarly to the receivers and the distillation chambers there are means for rinsing out with water, or the removal may be carried out with a worm inserted at the bottom of the chamber.

By means of separate pipes steam withdrawn from the concentration chambers and also the vapors of water and glycerine withdrawn from the distillation chambers and condensed are collected in separate receivers. The glycerine receivers are kept so hot that no condensation of the water vapor takes place.

According to the present invention it is possible to obtain a pure glycerine which satisfies all requirements from aqueous solutions of, or containing, glycerine or crude glycerine in a continuous operation by a satisfactory and rapid distillation with the avoidance of waste caused by the formation of tar or polyglycerine and with considerable savings of heat due to the employment of liquids of low boiling point in fine dispersion, preferably in the state of mist instead of superheated steam.

The following examples will further illustrate the nature of this invention, but the invention is not restricted thereto.

*Example 1*

Spent soap lye crude glycerine having a density of 1.309 and a glycerine content of 82 per cent is heated to from 160° to 180° C. at a pressure of 30 millimeters of mercury and is treated with wet steam having a temperature of 60° C. The receivers arranged after the still for the distillation are kept at 110° C. and a pale, neutral glycerine having a pure sweet taste, a specific gravity of 1.261 and a content of 99 per cent of glycerine is obtained in a yield of 98 per cent of the theoretical yield.

*Example 2*

Crude saponification glycerine having a specific gravity of 1.25 is treated at 180° C. and 20 millimeters mercury with a mist of carbon tetrachloride which is obtained by sucking some air or carbon dioxide of about 10° C. through a storage vessel filled with carbon tetrachloride kept at a temperature of 5° C. The receivers arranged after the still for the distillation are kept at 110° C. and a glycerine having a specific gravity of from 1.262 is obtained in a practically quantitative yield.

*Example 3*

A mist of benzine which is obtained by sucking some air or carbon dioxide maintained at about 10° C. through a storage vessel filled with benzine kept at 10° C., is passed through a crude saponification glycerine at 180° C. and 20 millimeters mercury having a specific gravity of 1.25 and a content of 0.56 per cent its weight of inorganic matter. The receivers arranged after the still for the distillation are kept at 110° C. and pure glycerine having a specific gravity from 1.260 to 1.262 collects therein in a practically quantitative yield, the water and the benzine being condensed and recovered in condensers arranged after the aforesaid receivers.

What we claim is:

1. The process for the production of pure glycerine which comprises treating crude glycerine in vacuo with a mist of a liquid, inert to glycerine and having a boiling point below that of the glycerine, while heating the crude glycerine to a temperature below its boiling point at atmospheric pressure, but above the boiling point of the said liquid at the pressure employed.

2. The process for the production of pure glycerine which comprises treating crude glycerine in vacuo with a mixture of a gaseous carrier and of a mist of a liquid, inert to glycerine and having a boiling point below that of the glycerine, while heating the crude glycerine to a temperature below its boiling point but above the boiling point at atmospheric pressure of the said liquid at the pressure employed.

3. The process for the production of pure glycerine which comprises treating crude glycerine in vacuo with a mist of water, while heating the glycerine to a temperature below its boiling point at atmospheric pressure, but above the boiling point of water at the pressure employed.

4. The process for the production of pure glycerine which comprises treating crude glycerine in vacuo with wet steam, while heating the crude glycerine to a temperature below its boiling point at atmospheric pressure, but above the boiling point of water at atmospheric pressure.

5. The process for the production of pure glycerine which comprises treating crude glycerine at about 30 millimeters mercury with wet steam, while heating the crude glycerine to a temperature below its boiling point at atmospheric pressure, but above the boiling point of water at atmospheric pressure.

6. The process for the production of pure glycerine which comprises concentrating an aqueous solution comprising glycerine while heating in vacuo and treating the concentrated crude glycerine in vacuo with a mist of a liquid, inert to glycerine and having a boiling point below that of the glycerine, while heating the glycerine to a temperature below its boiling point at atmospheric pressure, but above the boiling point of the said liquid at the pressure employed.

In testimony whereof we have hereunto set our hands.

EUGEN BERNHARD.
GUENTHER KUNZE.